United States Patent
Falb et al.

(10) Patent No.: US 10,380,451 B2
(45) Date of Patent: Aug. 13, 2019

(54) SYSTEM AND METHOD FOR VISIBILITY RANGE DETECTION (71) Applicant: Gentex Corporation, Zeeland, MI (US)

(72) Inventors: David M. Falb, Grand Rapids, MI (US); David J. Wright, Grand Rapids, MI (US); Oliver M. Jeromin, Holland, MI (US); Jeremy A. Schut, Grand Rapids, MI (US); Sergio E. Murillo Amaya, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 194 days.

(21) Appl. No.: 14/932,154

(22) Filed: Nov. 4, 2015

(65) Prior Publication Data
US 2016/0132745 A1 May 12, 2016

Related U.S. Application Data (60) Provisional application No. 62/076,223, filed on Nov. 6, 2014.

(51) Int. Cl.
G06T 7/00 (2017.01)
G06K 9/46 (2006.01)
(Continued)

(52) U.S. Cl.
CPC ....... *G06K 9/4604* (2013.01); *G06K 9/00791* (2013.01); *G06K 9/6201* (2013.01);
(Continued)

(58) Field of Classification Search
CPC ............... G06K 9/4604; G06K 9/6201; G06K 9/00791; H04N 5/2355; H04N 5/3537;
(Continued)

(56) References Cited

U.S. PATENT DOCUMENTS 2,907,889 A 10/1959 De Lisle Nichols et al.
3,299,769 A 1/1967 Byers
(Continued)

FOREIGN PATENT DOCUMENTS

CN 101637030 B 3/2013
DE 102005035810 A1 2/2007
(Continued)

OTHER PUBLICATIONS

International Search Report and Written Opinion of the International Searching Authority dated Feb. 11, 2016 for International Application No. PCT/US2015/059014, filed Nov. 4, 2015.
(Continued)

*Primary Examiner* — Zhihan Zhou
(74) *Attorney, Agent, or Firm* — Price Heneveld LLP; Bradley D. Johnson (57) ABSTRACT

A system for calculating a visibility range from a vehicle is disclosed. The system comprises a high dynamic range image sensor system comprising a pixel array including a plurality of pixels. The image sensor further includes readout circuitry in electrical communication with each pixel of the pixel array. The readout circuitry is operable to readout a distinct pixel value corresponding to one of a plurality of exposure times for each pixel in a single image frame. The system further comprises at least one processor in communication with the readout circuitry. The processor is operable to calculate a visibility range from the vehicle based on a plurality of image processing algorithms.

14 Claims, 4 Drawing Sheets (51) Int. Cl.
*G06K 9/62* (2006.01)
*G06K 9/00* (2006.01)
*H04N 5/355* (2011.01)
*H04N 5/235* (2006.01)
*H04N 5/353* (2011.01)
*B60Q 1/14* (2006.01)
*B60Q 1/20* (2006.01)
*B60Q 1/26* (2006.01)

(52) U.S. Cl.
CPC ........... *G06T 7/00* (2013.01); *H04N 5/35554* (2013.01); *B60Q 1/1423* (2013.01); *B60Q 1/20* (2013.01); *B60Q 1/2603* (2013.01); *B60Q 2300/054* (2013.01); *B60Q 2300/31* (2013.01); *G06T 2207/10016* (2013.01); *G06T 2207/30252* (2013.01); *H04N 5/2355* (2013.01); *H04N 5/3537* (2013.01)

(58) Field of Classification Search
CPC ...... H04N 5/35554; G06T 2207/30252; G06T 2207/10016; G06T 7/00; B60Q 1/1423; B60Q 1/20; B60Q 1/2603; B60Q 2300/054; B60Q 2300/31
See application file for complete search history.

(56) References Cited

U.S. PATENT DOCUMENTS

| | | |
|---|---|---|
| 3,668,674 A | 6/1972 | Westendorf |
| 4,931,767 A | 6/1990 | Albrecht et al. |
| 5,663,710 A | 9/1997 | Fasig et al. |
| 5,987,152 A | 11/1999 | Weisser |
| 6,085,152 A | 7/2000 | Doerfel |
| 6,108,084 A | 8/2000 | Winner |
| 6,128,088 A | 10/2000 | Nishiwaki |
| 6,362,773 B1 | 3/2002 | Pochmuller |
| 6,840,342 B1 | 1/2005 | Hahn |
| 6,853,453 B2 | 2/2005 | Kwon |
| 6,947,576 B2 | 9/2005 | Stam et al. |
| 7,016,045 B2 | 3/2006 | Kwon |
| 7,274,386 B2 | 9/2007 | Pochmuller et al. |
| 7,350,945 B2 | 4/2008 | Albou et al. |
| 7,602,937 B2 | 10/2009 | Mian et al. |
| 7,656,277 B2 | 2/2010 | Kawasaki |
| 7,756,298 B2 | 7/2010 | Miyahara et al. |
| 7,873,188 B2 | 1/2011 | Hautiere et al. |
| 7,899,207 B2 | 3/2011 | Mian et al. |
| 7,944,362 B2 | 5/2011 | Hue et al. |
| 7,970,178 B2 | 6/2011 | Song |
| 8,134,692 B2 | 3/2012 | Yamaguchi |
| 8,180,108 B2 | 5/2012 | Rebut et al. |
| 8,256,821 B2 | 9/2012 | Lawlor et al. |
| 8,269,950 B2 | 9/2012 | Spinelli et al. |
| 8,315,766 B2 | 11/2012 | Rebut et al. |
| 9,137,498 B1 * | 9/2015 | L'Heureux .............. H04N 7/18 |
| 2003/0197867 A1 | 10/2003 | Kwon |
| 2004/0008410 A1 * | 1/2004 | Stam ....................... B60R 1/062 359/443 |
| 2004/0046866 A1 | 3/2004 | Pöchmüller et al. |
| 2007/0230800 A1 * | 10/2007 | Miyahara ........... G06K 9/00798 382/224 |
| 2009/0161914 A1 * | 6/2009 | Song .................... G01N 21/538 382/106 |
| 2010/0020205 A1 * | 1/2010 | Ishida ..................... G06T 5/008 348/241 |
| 2010/0027838 A1 | 2/2010 | Mian et al. |
| 2010/0241321 A1 | 9/2010 | Luka et al. |
| 2010/0260413 A1 * | 10/2010 | Yamazaki ............... G06T 5/009 382/164 |
| 2011/0074957 A1 * | 3/2011 | Kiyohara ............... G06K 9/342 348/148 |
| 2013/0176425 A1 | 7/2013 | Lerner |
| 2013/0250113 A1 * | 9/2013 | Bechtel ..................... B60R 1/04 348/148 |
| 2014/0233805 A1 * | 8/2014 | Faber ...................... G01W 1/00 382/104 |
| 2015/0193656 A1 * | 7/2015 | Kounavis ........... G06K 9/00355 382/165 |

FOREIGN PATENT DOCUMENTS

| | | |
|---|---|---|
| EP | 1067399 A2 | 6/1999 |
| EP | 1422663 A1 | 5/2004 |
| EP | 1474652 B1 | 4/2007 |
| EP | 1868161 A1 | 12/2007 |
| EP | 2056093 A1 | 5/2009 |
| EP | 2063255 A2 | 5/2009 |
| JP | S63188741 A | 8/1988 |
| JP | 2002014038 A | 1/2002 |
| JP | 2007265277 A | 10/2007 |
| JP | 2010518746 A | 5/2010 |
| JP | 2012043359 A | 3/2012 |
| WO | 2003069275 A1 | 8/2003 |
| WO | 2008100307 A1 | 8/2008 |
| WO | 2014032903 A1 | 3/2014 |

OTHER PUBLICATIONS

Mario Pavlic, Heidrun Belzner, Gerhard Rigoll, Slobodan Ilic, "Image Based Fog Detection in Vehicles."
F. W.Campbell and J. G.Robson, "Application of Fourier Analysis to the Visibility of Gratings," Physiological Laboratory, University of Cambridge, pp. 551-566, Nov. 10, 1967.
Taek Mu Kwon Ph.D, "Atmospheric Visibility Measurements using Video Cameras: Relative Visibility," Department of Electrical and Computer Engineering, University of Minnesota Duluth, CTS 04-03, Jul. 2004.
S. Bronte, L. M. Bergasa, P.F. Alcantarilla, "Fog Detection System Based on Computer Vision Techniques," Department of Electronics, University of Alcala.
Jean-Philippe Tarel et al., "Improved Visibility of Road Scene Images under Heterogeneous Fog," Paris, France.
Taek Mu Kwon, Ph.D, "An Automatic Visibility Measurement System Based on Video Cameras," Department of Electrical and Computer Engineering, University of Minnesota, Duluth Campus, pp. 1-62, Sep. 1998.
Jean-Philippe Tarel, et al., "Vision Enhancement in Homogeneous and Heterogeneous Fog," Version 1, Jun. 12, 2012.
Christoph Busch and Eric Debes, "Wavelet Transform for Analyzing Fog Visibility," Nov./Dec. 1998, pp. 66-71, vol. 13 No. 6.
Christoph Busch and Eric Debes, "Wavelet Transform for Visibility Analysis in Fog Situations," Computer Graphics Center, Germany.
Supplementary European Search Report dated Sep. 27, 2017 for European Application No. EP15856947.5 (PCT/US2015059014).
Japanese Office Action, Application No. 2017-524398, dated Nov. 5, 2018 (7 pages).
Chinese Office Action, Application No. 2015-00690086, dated Dec. 11, 2018 (7 pages).

* cited by examiner

FIG. 5B understanding of the embodiments of the
SYSTEM AND METHOD FOR VISIBILITY RANGE DETECTION

TECHNICAL FIELD

The present disclosure generally relates to a system and method for visibility range detection, and more particularly, relates to a high dynamic range image sensor system configured for visibility range detection.

SUMMARY

According to one aspect of the present disclosure, a system for calculating a visibility range from a vehicle is disclosed. The system comprises a high dynamic range image sensor system comprising a pixel array including a plurality of pixels. The image sensor further includes readout circuitry in electrical communication with each pixel of the pixel array. The readout circuitry is operable to readout a distinct pixel value corresponding to one of a plurality of exposure times for each pixel in a single image frame. The system further comprises at least one processor in communication with the readout circuitry. The processor is operable to calculate a visibility range from the vehicle based on a plurality of image processing algorithms.

According to another aspect of the present disclosure, an apparatus configured to identify a visibility range is disclosed. The apparatus comprises an image sensor system having a pixel array. The pixel array comprises a plurality of pixels and readout circuitry. The readout circuitry is in electrical communication with each pixel of the pixel array and is operable to capture a first pixel value for a first pixel corresponding to a first integration period. The readout circuitry is further operable to capture a second pixel value for a second pixel corresponding to a second integration period. The second pixel neighbors the first pixel in the pixel array. The apparatus further comprises at least one processor configured to identify the visibility range based on a contrast between the first pixel value and the second pixel value.

According to yet another aspect of the present disclosure, a method for detecting a visibility range for a vehicle is disclosed. The method includes steps of capturing a first pixel value for a first pixel of a pixel array at a first integration period. The first integration period is selected from a plurality of selectable integration periods in a current image frame of a plurality of image frames. Additionally the method includes capturing a second pixel value for a second pixel of the pixel array at a second integration period in the current image frame. The second pixel is adjacent the first pixel in the pixel array. The first pixel value is compared to the second pixel value to determine a current contrast value. Based on the current contrast value an object is identified. The current contrast of the object is compared to a plurality of previous contrast values of the object to determine the visibility range.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

The present illustrated embodiments reside primarily in combinations of method steps and apparatus components related to an image sensor system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Figure 1:
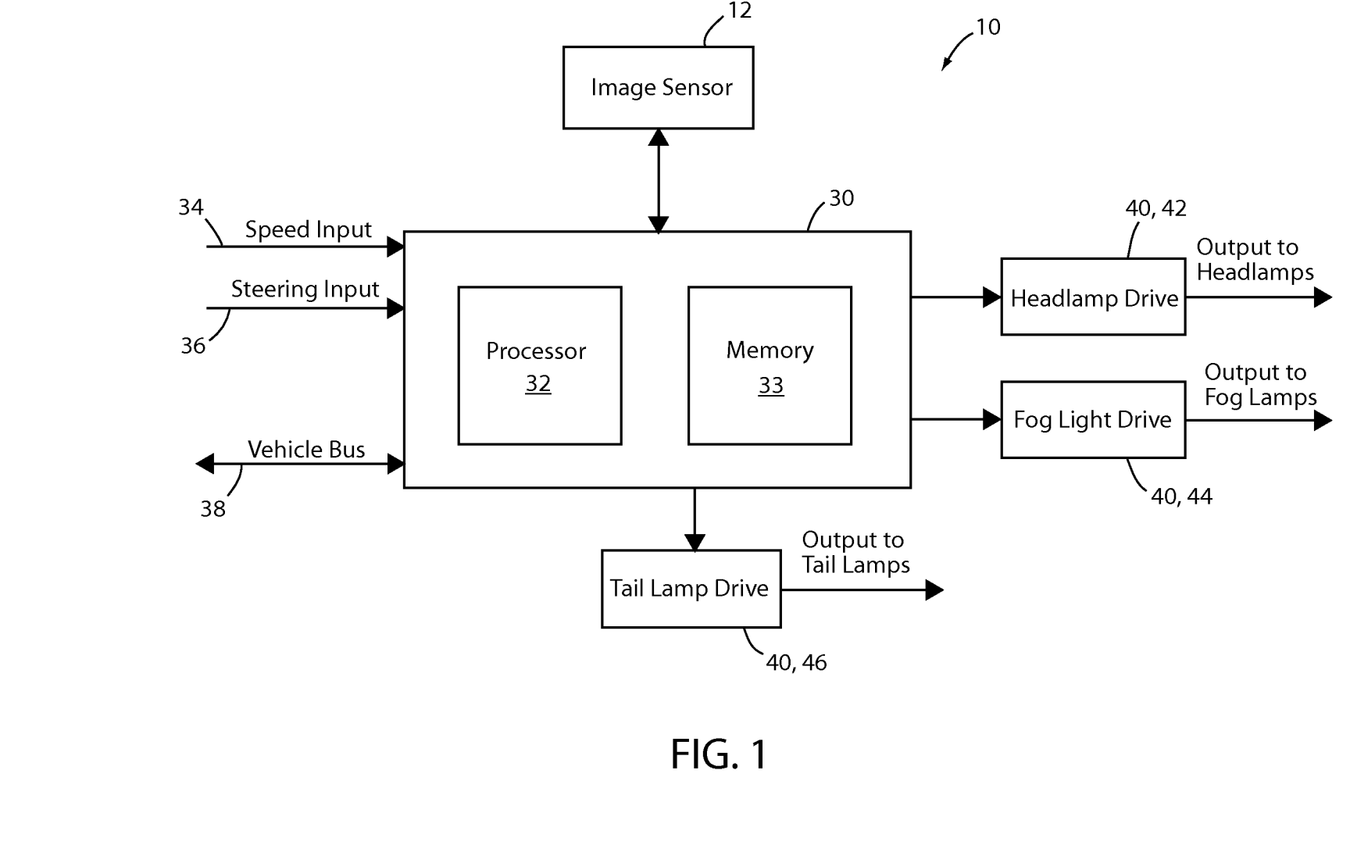
FIG. 1 is a block diagram of an image sensor system.
Figure 2:
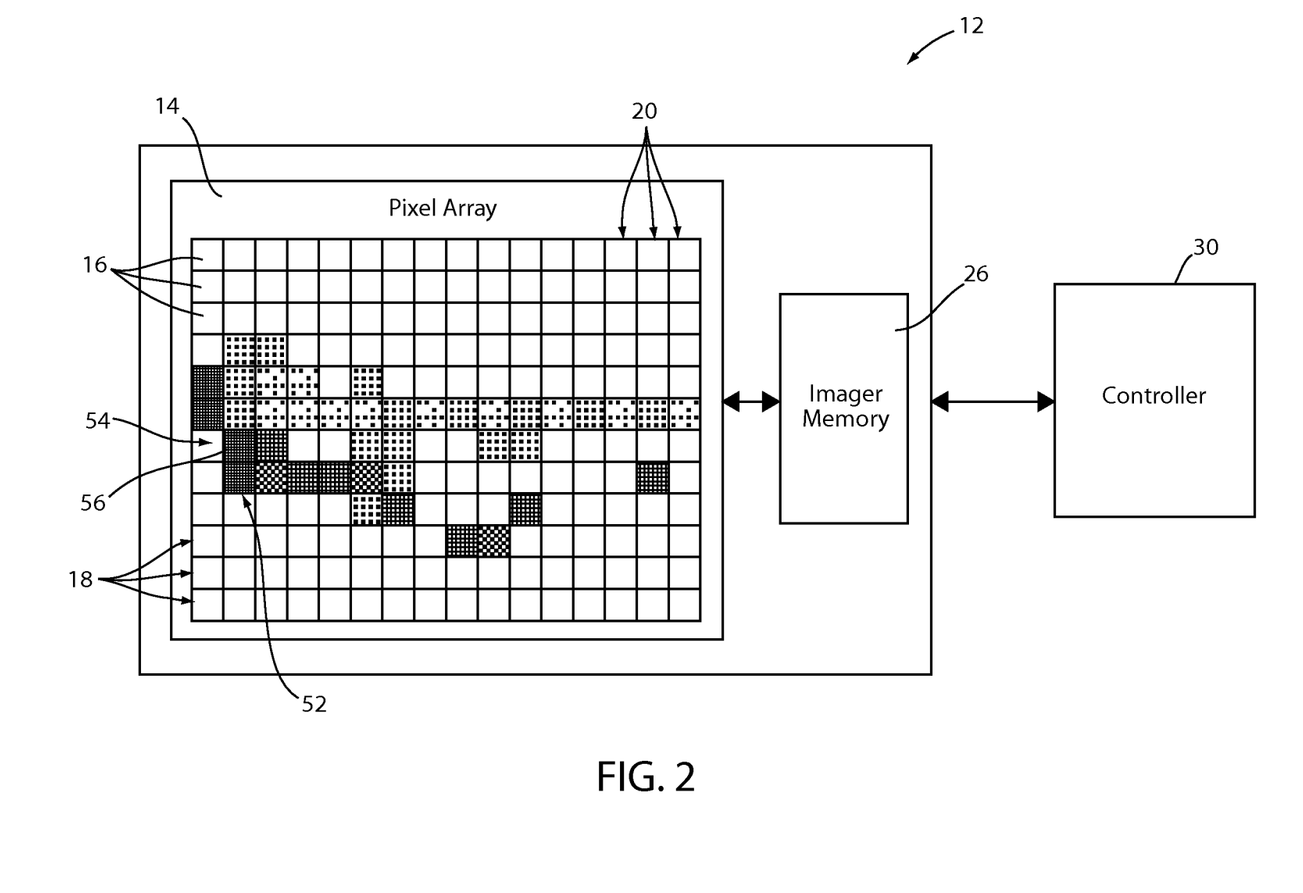
FIG. 2 is a block diagram of a pixel array of an image sensor system.

Referring to FIGS. 1 and 2, a high dynamic range image sensor system 10 is shown in accordance with the disclosure. An image sensor 12 of the system 10 includes a pixel array 14 including a plurality of pixels 16 forming a plurality of rows 18 and columns 20. The system 10 further comprises an imager memory 26 in communication with the pixel array 14. The imager memory 26 is configured having a plurality of memory cells operable to store pixel values for at least a portion of the plurality of pixels 16. The image sensor 12 is in electrical communication with a controller 30, which comprises a processor 32. The processor 32 is configured to receive and process image data from the image sensor 12.

The processor 32 is configured to process image frames corresponding to the image data and calculate a visibility range. The visibility range may correspond to an approximate distance of a roadway which is visible to a vehicle operator. The system 10 may be mounted in a vehicle accessory, such as a sun visor, overhead console, center console, dashboard, prismatic rearview mirror, A-pillar, or at any other suitable location in a vehicle. The controller further comprises a controller memory 33, for example random access memory (RAM), which may be utilized to store various instructions and/or image data during processing. The controller 30 and the processor 32 can be implemented using a microcontroller, a microprocessor, a digital signal processor, a programmable logic unit, a discrete circuitry, or any combination thereof. Additionally, the microcontroller may be implemented using more than one microprocessor.

The controller 30 is demonstrated in communication with a plurality of inputs for example, a speed input 34, a steering input 36, and a vehicle bus 38. The speed input 34 provides a signal communicating a speed of the vehicle via a speedometer or any device operable to measure and communicate data corresponding to the speed of a vehicle. The steering input 36 is configured to communicate steering data for example, a steering angle of a steering wheel and/or front wheels of the vehicle. The speed data and the steering data may be utilized in the controller 30 in combination with the image data to determine a location and/or distance of an object identified in the image data relative to the vehicle. The vehicle bus 38 may be implemented using any suitable standard communication bus, such as a Controller Area Network (CAN) bus. The vehicle bus 38 may be configured to provide a variety of additional information to the controller 30.

In some implementations, the system 10 may further be implemented in combination with at least one light controller 40, for example a headlamp drive 42, a fog light drive 44, and/or a tail lamp drive 46. Each of the light controllers 40 may be configured to control an intensity of light emitted from vehicle headlamps, fog lamps, and/or tail lamps in response to a visibility range calculated by the controller 30. For example, the controller 30 may be operable to control the headlamps to emit light in a low beam setting and a high beam setting. In such embodiments, the processor 32 is configured to output signals to the headlamp drive 42 to control the low beam headlamps and the high beam headlamps. The image data from the image sensor 12 may provide additional information corresponding to the operating environment of the vehicle, such that the controller 30 may adjust the headlamps on the host vehicle via the headlamp drive 42. At least one implementation of a headlight control system is taught in U.S. Pat. No. 6,049,171, entitled "CONTINUOUSLY VARIABLE HEADLAMP CONTROL," filed by Joseph Stam et al. on Sep. 18, 1998, the disclosure of which is incorporated herein by reference.

In some implementations, the system 10 may be operable to adjust a lighting level of at least one vehicle lighting device among a plurality of lighting levels in response to the visibility range calculated by the controller 30. For example, the controller 30 may be configured to adjust the headlamps, fog lamps, and/or tail lamps to a plurality of lighting intensities in response to the visibility range. In some implementations, the lighting devices may comprise light sources operable to emit light at a variety of intensities corresponding to a duty cycle of the light sources. In such implementations, at least one of the light controllers 40 may be operable to vary an output intensity of light emitted from its corresponding light sources by adjusting a duty cycle of a control signal supplied to the light sources. In such embodiments, the controller may be operable to control intensity of the lighting devices over three or more intensities corresponding to a visibility detected by the controller.

In various implementations, the system 10 may be operable to control the light controllers 40 based on a variety of control schemes. In some implementations, the system may be utilized to send control signals to the fog light drive 44 to selectively activate or deactivate the fog lamps in response to a low visibility and a high visibility, respectively. In some implementations, the system may be configured to send control signals to one or more of the headlamp drive 42 and/or the tail lamp drive 46 to control the a brightness level of the headlamps and/or the tail lamps. The system may also be operable to selectively activate or deactivate a low beam or a high beam setting of headlamps and may also be configured to activate one or more specialized beam patterns (e.g. an "all weather" beam pattern) in response to an increase or decrease in the visibility range. In some implementations, the controller 30 may also be operable to output a speed control signal via the vehicle bus 38 to identify hazardous speed conditions based on a low visibility. In response to the speed control signal, one or more control systems of the vehicle may limit a speed of the vehicle to ensure that the vehicle operator drives with caution in low visibility conditions.

The light sources of the vehicle lighting devices may correspond to a variety of forms of light sources. In some implementations, the light sources may be in the form of light emitting diodes (LEDs), organic LEDs, and/or other solid-state light sources. Such devices may be adjusted by the controller 30 to emit a light at any number of intensities by delivering signals to the light controllers 40 to control the duty cycle of each lighting device. In such configurations, the controller 30 may be operable to supply control signals to each of the light controllers 40 such that each of the vehicle lighting devices may be configured to emit light at a plurality of intensities, which may increase or decrease relative to a visibility range calculated by the controller 30.

Referring now to FIG. 2, the image sensor 12 is shown in communication with the controller 30. The controller 30 is in communication with the imager memory and is configured to control an image capture operation of the image sensor 12. The image sensor 12 may be configured to temporarily store pixel data and/or exposure data corresponding to each pixel 16 of the pixel array 14 to capture image data corresponding to a high dynamic range image. The image data is read-out from the pixel array 14 of the image sensor 12 by one or more readout circuits. The pixel array includes the plurality of pixels 16 in the form of light sensitive elements configured to measure light that may be received through a lens or aperture.

The image sensor 12 may correspond to any device operable to capture image data. In one implementation, the pixel array 14 of the image sensor 12 may comprise a CMOS image sensor, for example a CMOS active-pixel sensor (APS) or a charge coupled device (CCD). Each of the pixels 16 of the pixel array may correspond to a photo-sensor, an array of photo-sensors, or any grouping of sensors configured to capture light. Each of the photo-sensors may be operable to measure a pixel value in the pixel array 14. The controller 30 may comprise any processor or controller operable to process data from the image data as supplied in analog or digital form from the at least one readout circuit. For example, the controller 30 may be implemented as a plurality of processors, a multicore processor, or any combination of processors, circuits, and peripheral processing devices.

The image sensor 12 includes the imager memory 24 integrated as an integrated circuit (IC) on an IC die. The IC die may be of silicon, aluminum, copper, or other materials that may be utilized to manufacture ICs. The imager memory 24 is included in the package of the image sensor 12 such that the IC may be implemented using limited materials and having a minimal footprint. The construction of the IC including the memory includes various space saving and processing benefits, but may correspond to an increased manufacturing cost of the memory. As such, the methods and systems discussed herein may provide improved cost savings for the image sensor 12. The imager memory may comprise various forms of memory, for example, random access memory (RAM), dynamic RAM (DRAM), synchronous DRAM (SDRAM), and other forms of memory configured to store digital information. Each of the memory cells may correspond to an addressable memory location in the imager memory and have a capacity corresponding to the resolution of each pixel 16 of the pixel array 14.

The pixel array 14 may be arranged in rows 18 and columns 20 corresponding to groupings of pixels. Each of the groupings of pixels may be read by one or more A/D converters which may be disposed as components of the image sensor 12 or the controller 30. The one or more A/D converters may correspond to high speed A/D converters. In some implementations, the A/D converter may have a high sampling rate and a resolution corresponding to a resolution required to measure a particular resolution of the pixels 16 in the pixel array 14. In general, the A/D converter may have a sampling rate operable to digitize a plurality of samples in a row scanning sequence for a grouping of pixels (e.g. a row or column of pixels) during a row sequence time corresponding to an exposure time. The exposure time may correspond to a temporal period in which each pixel 16 of the pixel array 14 is exposed during an integration period. Once each pixel 16 of the pixel array 14 reaches a saturation level or a total integration time, pixel data and exposure data for each pixel may be stored into the imager memory 26. Once the exposure time for a single image frame has passed for at least one of the groupings of pixels (e.g. rows 18 or columns 20), the controller 30 may readout the image data and utilize the image data to determine a visibility range from the vehicle.

In some embodiments, the image sensor 12 may be operable to detect the image data having a high dynamic range for each pixel 16 of the pixel array 14. For example, in some implementations, the visibility range may be detected based on a level of contrast of one or more objects detected in the image data. An object 52 in the image data from the pixel array 14 may correspond to one or more darkened pixels having a long exposure time. A boundary 54 of the object 52 may correspond to one or more light pixels having a short exposure time. In this way, the controller 30 may identify the object 52 and a relative contrast between the boundary 54 and the object 52 in a single image frame.

The image sensor 12 may be configured to detect an integration period of each of the pixels 16 by categorizing the exposure of each of the pixels 16 in one of a plurality of selectable integration periods. For example, during the capture of a single image frame, the image sensor 12 may sample the exposure value of each of the pixels a plurality of times to determine whether to assign each pixel one of four selectable integration times. During a first integration period, if the sample for one of the pixels 16 demonstrates that the pixel will saturate (e.g. the sampled pixel value is above a predetermined threshold), the controller 30 will assign the first integration period to the pixel and conditionally reset the pixel. If the sample for one of the pixels 16 demonstrates that the pixel will not saturate (e.g. the sampled pixel value is below a predetermined threshold), the controller 30 will allow the pixel to continue to integrate through a second, longer integration period. In this way, a high level of contrast may be captured for neighboring pixels, for example those defining the object 52 and the boundary 54.

By accurately capturing an edge 56 of the object 52, as defined by the contrast between the object 52 and the boundary 54, the image sensor 12 is operable to accurately capture short and long exposure data in a single image frame for neighboring pixels. As discussed herein, the image sensor 12 may be operable to capture image data having a high dynamic contrast by capturing image data over four selectable integration periods, each approximately 16 times shorter than the next longer selectable integration period. In this way, the controller 30 may identify the contrast between the object 52 and the boundary 54 in a single image frame such that the visibility range from the vehicle may be calculated accurately and quickly.

Though the image sensor 12 is described as being configured to capture image data over four selectable integration periods, each approximately 16 times shorter than the next longer selectable integration period, various integration periods may be utilized. For example, the image sensor 12 may be configured to have six selectable integration periods, each approximately 8 times shorter than the next longer selectable integration period. In an exemplary implementation, the image sensor may be configured to have eight selectable integration periods, each approximately 4 times shorter than the next longer selectable integration period. As such, the image sensor 12 may be implemented in a variety of configurations and may be operable to capture a distinct pixel value corresponding to one of a plurality of exposure times for each pixel in a single image frame.

The image data may be stored in the imager memory 26 in a plurality of memory locations. The plurality of memory locations may be configured to store an identifying index of an integration period, a gain, and a resolution for each pixel 16. The plurality of memory locations may comprise a plurality of bits configured to store the image data for each pixel 16. After the conditional reset, each pixel 16 may begin integrating again for the remainder of the exposure time, contingent upon further possible conditional resets.

Examples of image sensors configured to operate as high dynamic range image sensors as discussed herein are disclosed in U.S. Pat. No. 8,289,430 entitled "HIGH DYNAMIC RANGE IMAGING DEVICE," filed Dec. 6, 2007, by Jon H. Bechtel et al.; U.S. Pat. No. 8,305,471 entitled "HIGH DYNAMIC RANGE IMAGING DEVICE," filed Apr. 25, 2008, by Jon H. Bechtel et al.; U.S. Pat. No. 8,378,284 entitled "IMAGING DEVICE," filed Jan. 28, 2009, by Daniel Van Blerkom et al.; and U.S. Pat. No. 8,144,223 entitled "IMAGING DEVICE," filed Jan. 28, 2009, by Daniel Van Blerkom et al.; and U.S. Pat. No. 8,629,927, entitled "IMAGING DEVICE," filed Apr. 9, 2008; U.S. Pat. No. 8,587,706, entitled "IMAGING DEVICE," filed Jun. 11, 2008, by Jon H. Bechtel; and U.S. Pat. No. 9,041,838 entitled "HIGH DYNAMIC RANGE IMAGER SYSTEM," filed Feb. 14, 2013, by Jon H. Bechtel all of which are hereby incorporated herein by reference in their entirety. Examples of processing image data are disclosed in U.S. Pat. No. 8,577,169 entitled "DIGITAL IMAGE PROCESSING AND SYSTEMS INCORPORATING THE SAME," filed Feb. 1, 2010, by Jeremy C. Andrus; U.S. Pat. No. 9,866,805, entitled "DIGITAL IMAGE PROCESSING AND SYSTEMS INCORPORATING THE SAME," filed Feb. 1, 2010, by Jon H. Bechtel; U.S. Pat. No. 8,463,035, entitled "IMPROVED DIGITAL IMAGE PROCESSING FOR CALCULATING A MISSING COLOR VALUE," filed May 27, 2010, by Jon H. Bechtel; and U.S. Patent Publication No. 2009/0086027, entitled "METHOD AND SYSTEM FOR PROVIDING IMAGES AND GRAPHICS," filed Feb. 21, 2008, by Benjamin Chaykin, all of which are hereby incorporated herein by reference in their entirety.

In an exemplary implementation, the image sensor 12 is a high dynamic range image sensor, wherein each pixel 16 is configured to independently integrate for any one of a plurality of available integration periods. The plurality of available integration periods may be simultaneous nested integration periods all ending at the same time. In some implementations, each pixel 16 is configured to independently select the integration period; the controller 30 may also be configured to independently select the integration period for each pixel 16, or a combination thereof. Each pixel 16 of the pixel array 14 may be read out by the at least one A/D converter a single time per frame.

Figure 3:
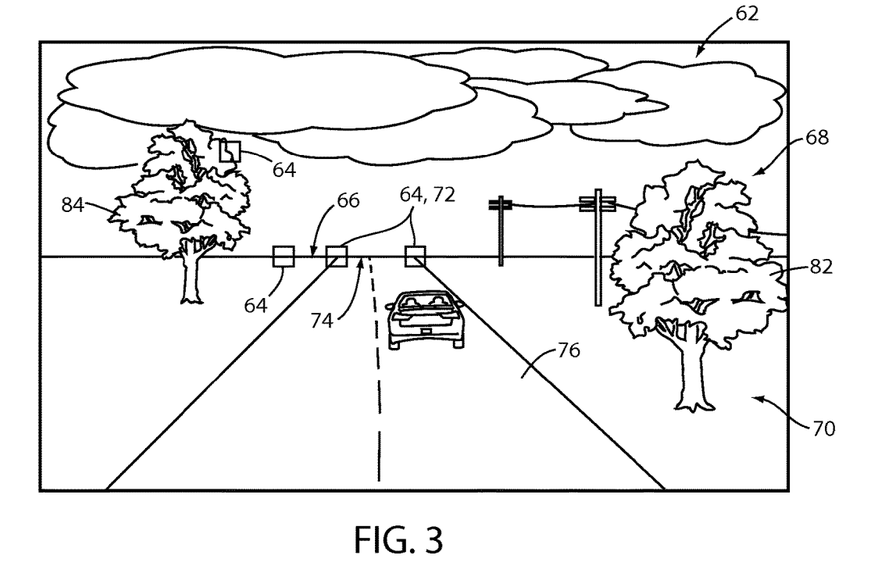
FIG. 3 is an illustrative view of an image frame captured by a high dynamic range image sensor corresponding to a scene having a reduced visibility.
Figure 4:
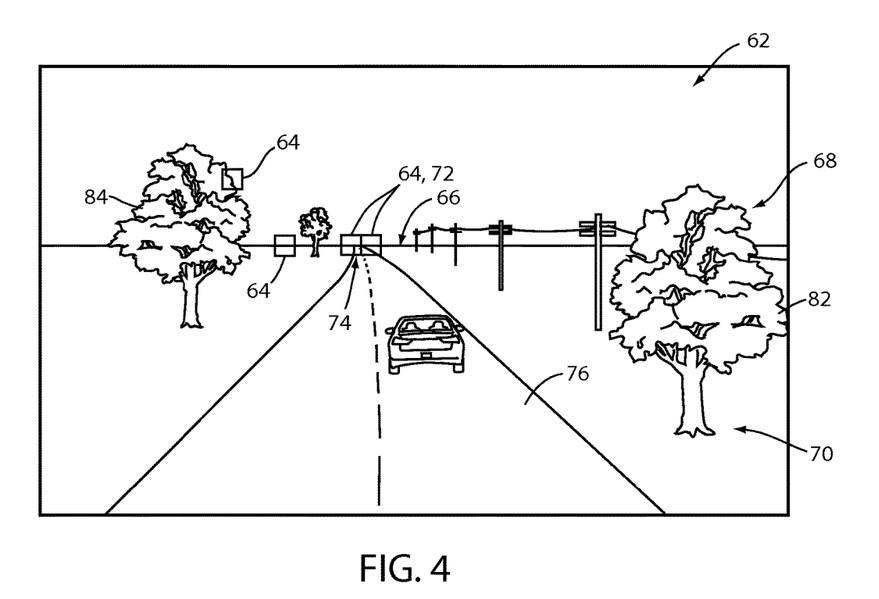
FIG. 4 is an illustrative view of an image frame captured by a high dynamic range image sensor corresponding to a scene having a typical visibility in clear conditions.

Referring now to FIGS. 3 and 4, illustrative views of image frames captured by the image sensor 12 are shown for a scene having a reduced visibility and a scene having a typical visibility in clear conditions, respectively. As discussed herein, the controller 30 may utilize the high dynamic range image data 62 from the image sensor 12 to calculate the visibility range from the vehicle. The visibility range may be calculated based on one or more of a horizon boundary contrast algorithm, an edge contrast algorithm, a color contrast, and an image texture algorithm. By utilizing one or more of these algorithms, the visibility range from the vehicle may be calculated with improved accuracy due to the high dynamic range that may be identified between neighboring pixels and the particular steps and combinations of the algorithms disclosed herein.

The horizon boundary contrast algorithm is configured to detect groups of pixels 64 in the image data. Each of the groups of pixels may correspond to portions or patches of contiguous pixels in the image data 62 that contain the boundary between the sky and objects on the ground. The horizon boundary contrast algorithm monitors the visibility range from the vehicle by analyzing the contrast between the sky and the objects in each of the groups of pixels. In general, when the visibility range decreases, for example during foggy conditions, the contrast between the sky and the objects located in the groups of pixels 64 will decrease.

A first step of the horizon boundary contrast algorithm may include identifying the groups of pixels 64 in the image data 62. The groups of pixels may be identified by calculating an average pixel intensity in all of the pixels or groups of pixels 64 that form the image data 62. In some implementations, the groups of pixels may correspond to 15×15 groups of pixels. The controller 30 may be configured to process each of the groups of pixels 64 from the top of the image data 62 in a downward direction and compare each of the groups to an average pixel intensity threshold and a pixel edge count threshold. The pixel edge count may correspond to the edges or contrasting portions identified in each of the groups of pixels 64. The controller 30 may process each of the groups of pixels 64 until a group of pixels 64 for each of a plurality of vertical columns is identified as an Earth/sky boundary 66.

The controller 30 may identify each of the groups of pixels 64 as a portion of the Earth/sky boundary 66 by calculating a number of edges in each pixel group 64 and an average pixel intensity of the pixels in each pixel group. A pixel group 64 corresponding to the Earth/sky boundary 66 may be identified by the controller 30 based on having a number of edges exceeding a pixel edge count threshold and an average pixel intensity below a pixel intensity threshold. The pixels 16 that make up each group of pixels 64 in the Earth/sky boundary 66 are then processed such that a vertical gradient is calculated by the controller 30. The gradient captures the difference in intensity or pixel values of the pixels corresponding to the sky 68 and those corresponding to the Earth 70 and/or objects in the image data 62.

The vertical gradient corresponds to a representation of contrast between the sky 68 and the Earth 70. The controller 30 may then identify the groups of road pixels 72 that lie close to the vanishing point 74 of the road 76 in front of the vehicle. The gradient values are then filtered such that a representative gradient intensity profile is calculated for distant portions of the scene. The controller 30 then fits the gradient intensity profile to a linear and quadratic curve model that maps the gradient profile to a visibility range. The visibility range is then determined based on the sample data that may be stored in the controller memory 33. Generally, a lower gradient profile, corresponds to a shorter visibility range from the vehicle.

The color contrast metric is configured to measure an amount of color change in the image. The visibility range from the vehicle is determined based on a relative intensity of the colors in the image data. For example, scenes having substantially clear visibility conditions may have more pronounced colors relative to scenes having reduced visibility conditions. By measuring the reduction in color changes across a large portion of the image, the controller 30 is operable to correlate a lack of color change to a visibility reduction.

As shown in FIGS. 3 and 4, a first color of a first object 82 and a second object 84 may differ from a second color of the sky 68. In the image data 62, corresponding to the scene having a reduced visibility shown in FIG. 3, the difference in color between the objects 82 and 84, and the sky 68 may be less apparent than in FIG. 4. More specifically, to identify a visibility range for a scene, the controller 30 may compute and map a hue image of each pixel 16 for the image data 62. The controller 30 is operable to detect edges of the hue image corresponding to changes in hue that exceed a hue threshold in order to indicate pixels in which a relatively large change in hue occurs. The controller 30 then may calculate the number of edges found in the hue image in order to obtain a metric for quantity of color changes in the image. This summation of the edges in the hue image is performed in different ways in order to measure a profile vertically and horizontally across this image. In this way, the system 10 may further utilize the high dynamic range image data 62 from the image sensor 12 to identify a visibility range from the vehicle.

Figure 5A:
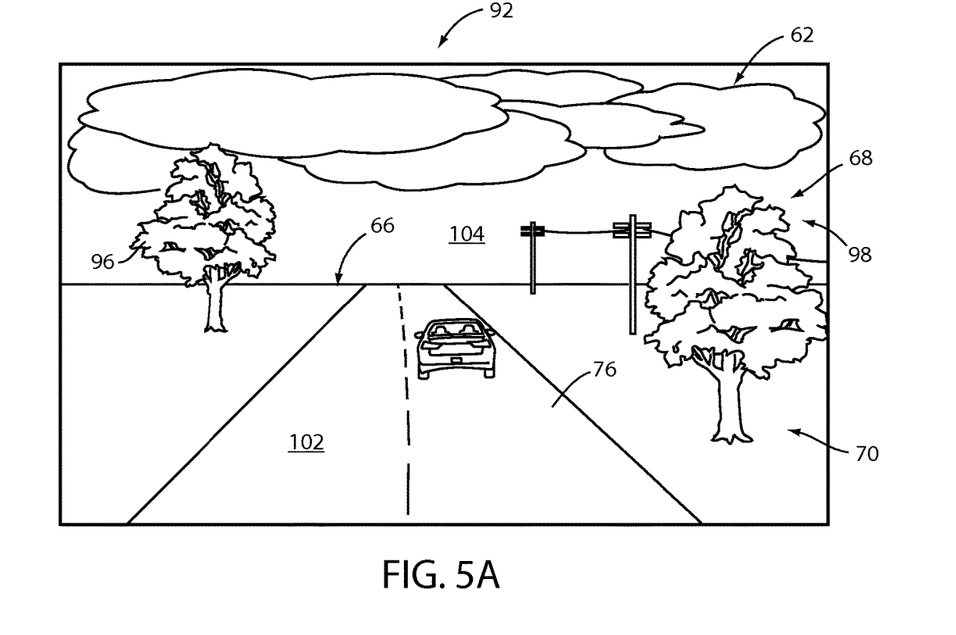
FIG. 5A is an illustrative view of an image frame captured by a high dynamic range image sensor corresponding to a scene at a first time.
Figure 5B:
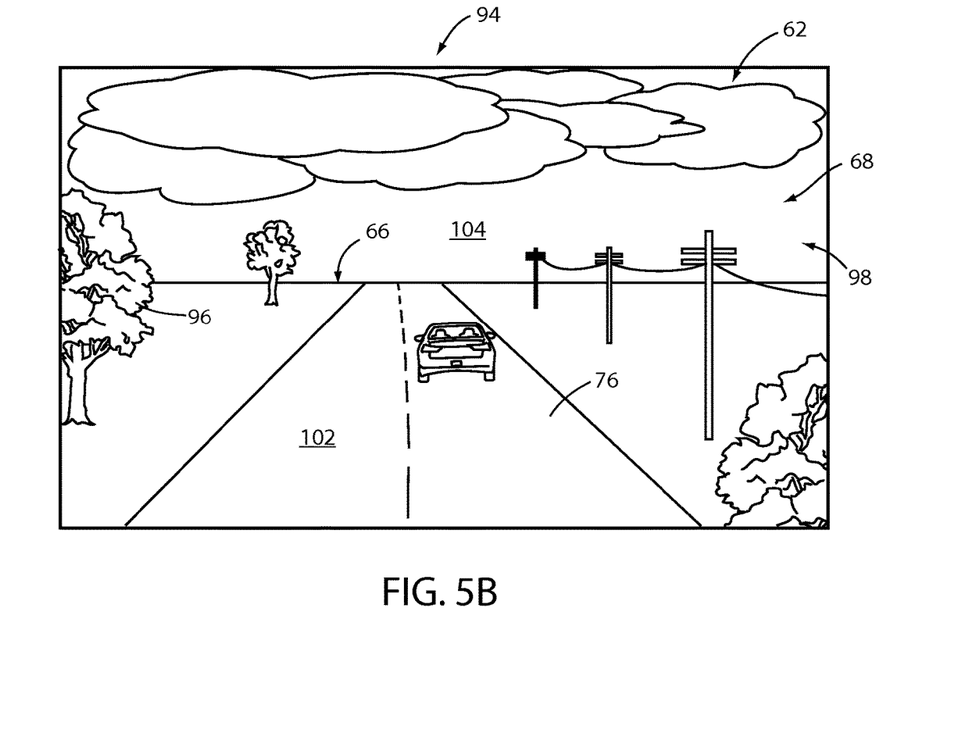
FIG. 5B is an illustrative view of an image frame captured by a high dynamic range image sensor corresponding to a scene at a second time in accordance with the disclosure.

Referring now to FIGS. 5A and 5B illustrative views of image frames captured by the image sensor 12 corresponding to a scene at a first time 92 and a second time 94 are shown, respectively. The object edge contrast algorithm is configured to identify a rate at which the contrast of an object 96 increases as the vehicle approaches the object 96. Based on an initial identification of the object 96, the controller 30 may identify the object 96 in a plurality of frames of the image data 62. After the object 96 has been identified in a plurality of image frames, the controller 30 may then compute the distance at which the contrast of the object 96 was approximately zero and similarly compute the visibility range from the vehicle.

The distance at which the contrast of the object 96 was approximately zero is calculated by breaking a subset of the image data 62 into horizontal bands and processing those bands through a vertical edge filter. The object 96 may be tracked by the controller 30 through a plurality of frames by tracking strong vertical edges that correlate among the plurality of frames. Based on speed data received from the speed input 34 and the frame rate of the image sensor 12, the controller 30 is operable to calculate how far an edge has moved between frames. Based on the strong vertical edges and the frame rate, a distance map of the tracked edges may be created by the controller 30.

With the distance map of the tracked edges, the contrast of the tracked edges and a background 98 may then be compared by the controller 30 over a period of time. Based on the locations of the tracked edges in the distance map over time, a line is fit to a corresponding group of contrast measurements and their respective computed distances. The line of best fit for the group of contrast measurements and their respective computed distances is then used to project the distance at which the contrast is approximately zero. At this approximate distance, the controller 30 may identify the visibility range from the vehicle.

The image texture algorithm is configured to analyze the image data 62 for high frequency content in order to estimate the visibility range from the vehicle. By utilizing this algorithm, the controller 30 is operable to identify changes in texture in the image data to estimate the visibility range from the vehicle. In scenes corresponding to high visibility and relatively clear conditions, a road surface 102 and a sky 104 are generally smooth and have substantial low frequency content. In scenes having a reduced visibility, the texture of the road surface 102 and the sky 104 may have increased texture and substantial high frequency content. By characterizing the relative texture of the image data 62, the controller 30 is operable to calculate visibility range from the vehicle.

The texture of the image data 62 may be calculated by the controller 30 by initially filtering the image data with a high pass filter. The image data 62 output from the filter is then normalized and quantized by the controller 30 to measure the texture of the image data 62. Based on the measured texture, a texture profile is calculated for a plurality of image frames captured by the image sensor 12. Each of the plurality of image frames is then correlated to a visibility range corresponding to the current conditions in the scene. As described herein, the controller is operable to determine the visibility range from the vehicle by a plurality of methods that may be utilized alone or in combination to accurately calculate a visibility range for a scene.

In some embodiments, the visibility range determined from the image data 62 may be utilized by the controller 30 to control a lighting intensity of the headlamp drive 42, the fog light drive 44, and/or the tail lamp drive 46. For example, the controller may be operable to vary the intensity of light emitted from various lighting devices, for example head lamps, fog lights, and/or tail lights in communication with the at least one light controller 40. As the visibility range from the vehicle decreases, the controller 30 may identify the diminished visibility and increase or decrease an intensity of at least one of the lighting devices accordingly. For example, the controller 30 may increase the intensity of the tail lights of the vehicle by sending a signal to the tail lamp drive 46 in response to the visibility being less than 50 meters. In response to receiving the signal from the controller 30, the tail lamp drive 46 may increase a duty cycle of a drive signal supplied to the tail lamps in order to increase the intensity of the light emitted from the tail lamps. In this way, the system 10 is operable to control an intensity of at least one of the lighting devices in response to the controller 30 detecting a change in the visibility range from the vehicle.

The controller 30 may be operable to calculate the visibility range from the vehicle in various increments. In some embodiments, the controller 30 may be operable to calculate the visibility range from the vehicle in 50 m increments at visibility ranges from 100 m to 400 m and 10 m increments at visibility ranges from 0 m to 100 m. For example, the controller 30 may be configured to calculate the visibility at a first incremental precision for visibility ranges that are closer to the vehicle and a second incremental precision for visibility ranges that are further from the vehicle. The first incremental precision is more precise than the second incremental precision. In this way, the controller is operable to provide increasing precision in calculations of the visibility range from the vehicle in response to the visibility range decreasing toward potentially hazardous operating conditions corresponding to low visibility range conditions.

The disclosure provides for a system 10 that is configured to utilize high dynamic range image data 62 from the image sensor 12 to calculate the visibility range from the vehicle. The visibility range may be calculated based on one or more of a horizon boundary contrast algorithm, an edge contrast algorithm, a color contrast, and an image texture algorithm. By utilizing one or more of these algorithms, the visibility range from the vehicle may be calculated with improved accuracy due to the high dynamic range of the image data 62 that may be identified between neighboring pixels in the various steps and operations disclosed.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A system for calculating a visibility range for a vehicle comprising:
    a high dynamic range image sensor system comprising:
        a pixel array comprising a plurality of pixels;
        readout circuitry in electrical communication with each pixel of the pixel array and operable to readout a distinct pixel value corresponding to one of a plurality of exposure times for each pixel in a single image frame; and at least one processor in communication with the readout circuitry, wherein, the processor is operable to:

calculate color metric identifying a hue change in a scene represented by the pixel values in the single image frame;

identify a plurality of edges in the scene based on the hue change exceeding a predetermined hue change threshold for a plurality of neighboring pixels of the plurality of pixels;

quantify the plurality of edges in the scene by summing the plurality of edges;

calculate the color metric based on the number of edges; and calculate a visibility range from the vehicle based on the color metric.

2. The system according to claim 1, wherein the processor is further operable to identify at least one edge of an object in response to the hue change exceeding a predetermined hue change threshold.

3. The system according to claim 2, wherein the plurality of edges are identified based on a contrast identified between the distinct pixel values of at least two neighboring pixels of the pixel array.

4. The system according to claim 1, wherein each of the plurality of exposure times is selected from a plurality of integration periods for each pixel.

5. The system according to claim 4, wherein the integration periods for each pixel correspond to time durations identified in response to a comparison of an exposure of each of the pixels to a plurality of predetermined exposure thresholds.

6. The system according to claim 5, wherein a selected integration period of the plurality of integration periods is determined by comparing the exposure of each pixel to the plurality of predetermined exposure thresholds.

7. The system according to claim 4, wherein the visibility range is determined from a comparison between at least two neighboring pixels, each of the neighboring pixels having an exposure value from a different integration period of the plurality of integration periods.

8. The system according to claim 1, wherein the color metric is calculated by calculating the number of edges vertically or horizontally.

9. An apparatus configured to identify a visibility range comprising:

an image sensor system comprising:
a pixel array comprising a plurality of pixels; and
readout circuitry in electrical communication with each pixel of the pixel array, the readout circuitry operable to capture pixel data for each pixel; and at least one processor configured to:
identify hue values based on the pixel data;
calculate a number of hue changes based on hue values;
identify a plurality of edges in the current image frame based on the number of hue changes identified in the plurality of pixels;
quantify the plurality of edges by summing the plurality of edges; and
identify a visibility range based on the summation of the plurality of edges.

10. The apparatus according to claim 9, wherein the number of hue changes is calculated in response to identifying changes in the hue values of the pixels proximate to each other exceeding a hue change threshold.

11. The apparatus according to claim 10, wherein the processor is configured to identify the hue changes by comparing the hue values for the pixels along a comparison direction.

12. The apparatus according to claim 11, wherein the comparison direction is at least one of a vertical direction and a horizontal direction of the pixels in the pixel array.

13. A method for detecting a visibility range for a vehicle comprising:

capturing a first pixel value for a first pixel of a pixel array at a first integration period of a plurality of selectable integration periods in a current image frame of a plurality of image frames;

capturing a second pixel value for a second pixel of the pixel array at a second integration period in the current image frame;

comparing the first pixel value to the second pixel value to determine a hue change value;

identify a plurality of edges in the current image frame by summing a plurality of hue changes by comparing a plurality of pixel values in the current image frame;

quantify the plurality of edges in the scene by summing the plurality of edges; and identifying a visibility range based on a quantity of the plurality of edges in the current image frame.

14. The method according to claim 13, further comprising:

sampling an exposure value of the first pixel a plurality of times to select the first integration period, and sampling an exposure value of the second pixel a plurality of times to select the second integration period.

* * * * *